No. 635,678.  
Patented Oct. 24, 1899.  
E. M. ECKARDT.  
VESSEL FOR TRANSPORT AND MEANS FOR CONSERVATION OF EFFERVESCING BEVERAGES THEREIN.  
(Application filed Dec. 27, 1897.)

(No Model.)  
2 Sheets—Sheet 1.

Witnesses:—  
Inventor  
Ernst M. Eckardt  
By his Atty.

No. 635,678. Patented Oct. 24, 1899.
E. M. ECKARDT.
VESSEL FOR TRANSPORT AND MEANS FOR CONSERVATION OF EFFERVESCING BEVERAGES THEREIN.
(Application filed Dec. 27, 1897.)
(No Model.) 2 Sheets—Sheet 2.

Witnesses. Inventor.
Ernst M. Eckardt
By his Atty.

UNITED STATES PATENT OFFICE.

ERNST MORITZ ECKARDT, OF DRESDEN, GERMANY.

VESSEL FOR TRANSPORT AND MEANS FOR CONSERVATION OF EFFERVESCING BEVERAGES THEREIN.

SPECIFICATION forming part of Letters Patent No. 635,678, dated October 24, 1899.

Application filed December 27, 1897. Serial No. 663,455. (No model.)

*To all whom it may concern:*

Be it known that I, ERNST MORITZ ECKARDT, a citizen of the Kingdom of Saxony, and a resident of Dresden, in the Kingdom of Saxony and German Empire, have invented certain new and useful Improvements in Vessels for the Transport and Means for the Conservation of Effervescing Beverages Therein, of which the following is a specification.

In this invention the effervescing beverage for transport and keeping is placed in a metal container the upper part of which is reduced and is there surrounded by a pressure-gas holder, from which gas—carbonic-acid gas, for instance—is automatically supplied to the beverage as required. The beverage-container and the gas-holder are inclosed in a wooden cask-like casing sufficiently large to provide around and at the bottom of the same an intermediate space for cooling purposes. The casing is provided a little below its upper edge with a centrally-apertured head or partition, upon the cover of which aperture is mounted the apparatus for the supply of gas to the beverage.

Figure 1:
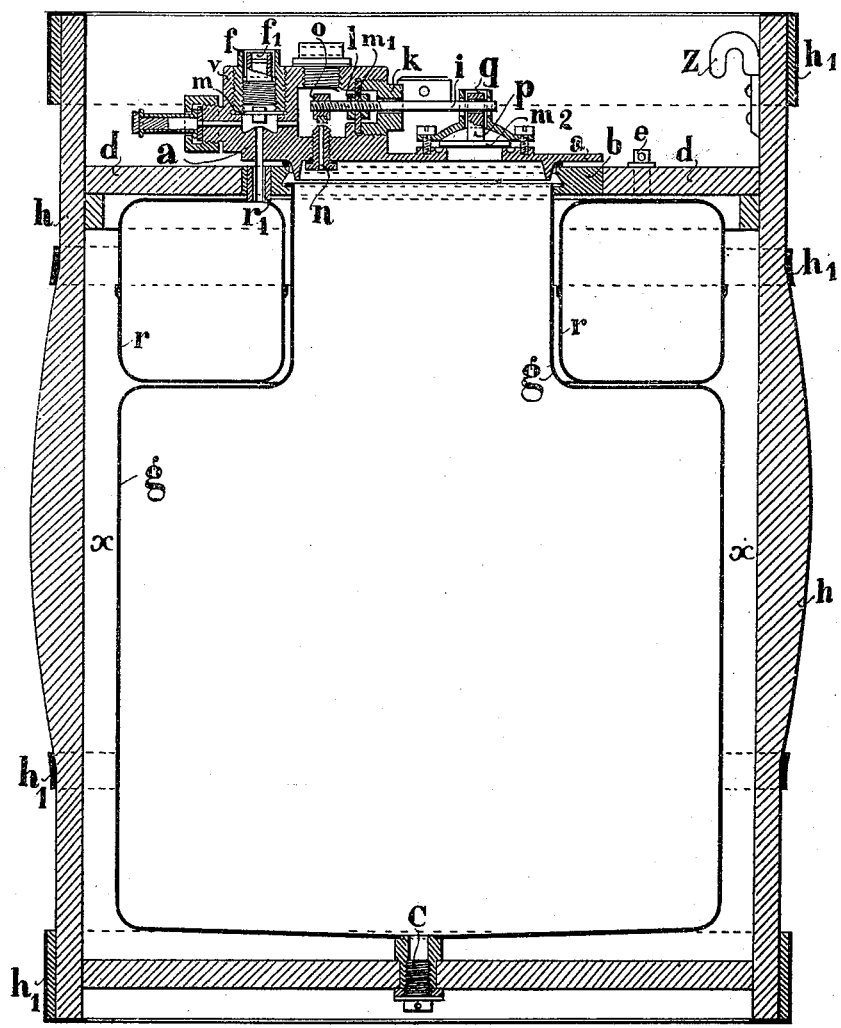
Figure 5:
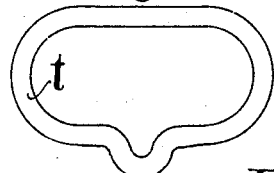
Figure 2:
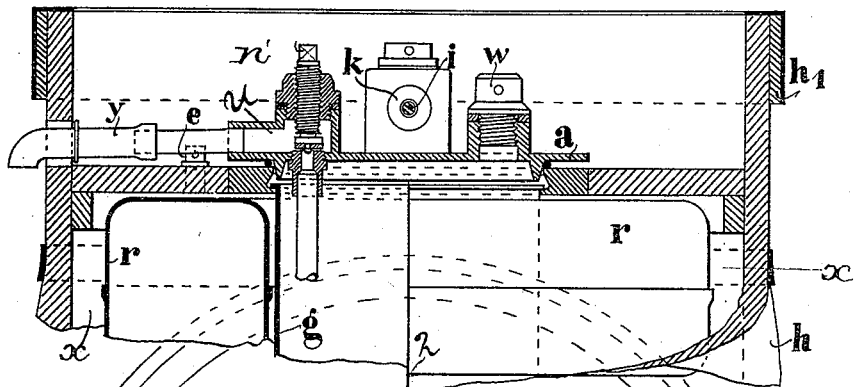
Figure 3:
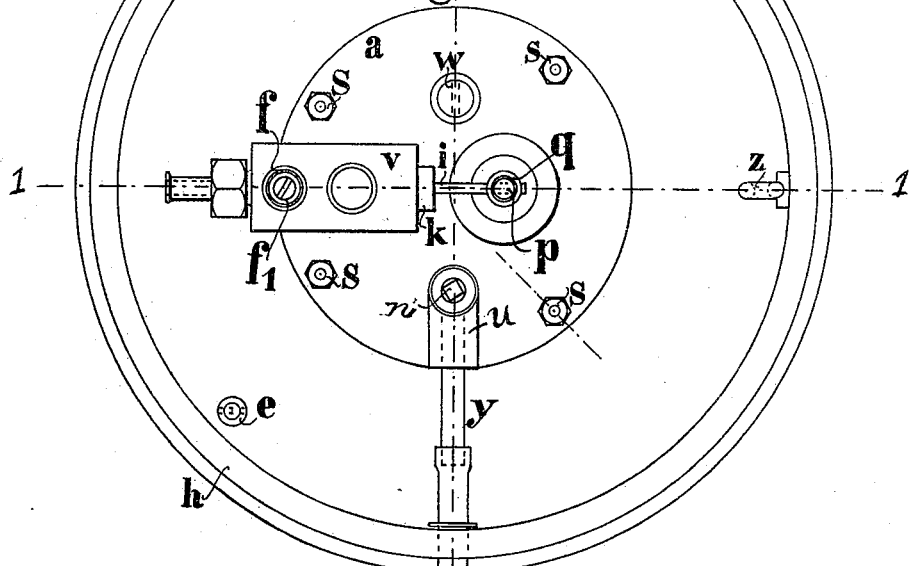
Figure 4:
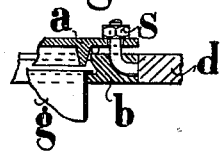

In the accompanying drawings, Figure 1 is a vertical section on line 1 1 of Fig. 3 of the complete device of the invention; Fig. 2, a vertical section on line 2 2 of Fig. 3; Fig. 3, a top view; Fig. 4, a detail view of a cover-fastening bolt in connection with the head and cover. Fig. 5 shows a hand-ring for use in carrying the vessel.

$g$ is the metal beverage-container, which for the purpose of preventing oxidation and impurities consequent thereon is enameled or tinned or otherwise suitably coated inside; $r$, the annular gas-holder surrounding the reduced upper end of the container $g$; $h$, the wooden casing; $x$, the intermediate cooling-space; $d$, the apertured head or partition, and $a$ the cover adapted to be fastened over the aperture in said head and against a metal ring $b$, encircling said aperture, the fastening-bolts $s$ being of a peculiar shape, as shown in Fig. 4.

$c$ is a screw-plug for opening and closing a discharge or cleaning aperture at the bottom of the container. $g$ and $e$ are similar screw-plugs in the head $d$ for charging and emptying the cooling-space. $h'$ are hoops such as are usually employed for holding together the staves of casks.

The gas-holder $r$, which is attached to the cover $a$, is provided with a tubular attachment $r'$, by which it communicates with the two valves—a shut-off valve and an automatic gas-pressure-supply valve—of the gas-supply apparatus. These valves are located in a casing $v$, the shut-off valve comprising a screw-socket $f$, turning therein, a screw $f'$, turning in the socket, and a membrane $m$, which latter closes tight against a shoulder formed in the casing when the socket $f$ is screwed down. The screw $f'$ may be turned in either direction to act upon the membrane $m$, which is located centrally over the pressure-gas passage of the valve and is provided above and underneath with strengthening-collars, as shown, having for object to render easier and more positive the action of the screw $f'$ on the membrane $m$, as also that of the membrane on the pressure-gas passage.

To shut off the gas flowing from the holder $r$, the screw $f'$ is turned down about half a turn, whereby the membrane $m$ is pressed down with its lower strengthening collar or boss upon the end of the pressure-gas-supply passage and closes it. To reopen the passage, the screw $f'$ is turned back correspondingly.

The gas-holder $r$ is charged through a screwed sleeve fitted in the same and passing through the head $d$ adjacent to the valve, which sleeve is closed by a solid screw-plug.

The automatic gas-pressure-supply valve connecting the gas-holder $r$ with the inside of the beverage-container $g$ comprises a lever mechanism which is actuated by the pressure of the gas upon membranes. In this mechanism $i$ is a lever, located partly within and partly without the casing $v$ and connecting the membranes $m'$ $m^2$, the former shutting off an inner space of the casing by means of a screwed head $k$, which presses the edge of the same against a shoulder formed in the casing. This membrane is shut off tight on the screw-threaded part of the lever $i$ by means of a small screw-nut $l$, taking against each side of the membrane, which at the same time serves as a movable adjuster of the lever $i$.

The central bore of the head $k$ is large enough to afford the lever $i$ the requisite play. Inside the casing this lever is provided at its end with a block or valve-body $o$, by which the bore of the adjustable screw $n$ is set open or closed, this bore being practically a continuation of the pressure-gas passage before referred to. The outer end of the lever $i$ is loose in the slide-stud $p$, which is firmly connected to the membrane $m^2$.

The pressure of the gas flowing into the beverage-container $g$ forces the membrane $m^2$ upward, the stud $p$ then performing a like movement in the casing $q$, whereby the lever $i$ so turns on the membrane $m'$ as to press the valve-body $o$ upon the bore of the screw $n$, and thus cut off the supply of gas to the beverage-container. Therefore the gas coming from the gas-holder $r$ can only reach in the container $g$ a certain and nearly constant density, which acts upon the beverage therein, because when some of this is drawn off the membrane $m^2$ will return and the valve-body $o$ rise to permit the passage of precisely so much gas into the container $g$ as will bring sufficient pressure against the membrane $m^2$ to bulge it upward, and thereby the valve-body $o$ downward, to close the bore of the screw $n$ and completely cut off the admission of gas.

$u$ is a casing into which the beverage rises from the lower part of the container $g$ to be drawn off as required through a discharge-tube $y$, Figs. 2 and 3, which is slightly inclined to prevent any of the beverage remaining therein and spoiling. The beverage is turned on and off by means of a screw $n'$, the lower end of which is furnished with an elastic packing for taking against the top end of or against the outlet from the said casing into the vessel $g$. The tube $y$ is made in two parts, one of which may be slid telescopically upon the other, so that when in transit no part of the tube need project beyond the wooden casing $h$. The unauthorized opening out of the tube may be guarded against by sticking a suitable label to the two parts.

As shown in Fig. 4, the screw-bolts $s$, by which the cover $a$ is attached to the head $d$, instead of having the usual head are formed with bent ends which are introduced into corresponding holes in the ring $b$ and may be removed therefrom after loosening, but without it being necessary to remove the nuts, which in this way cannot be exchanged or lost, and a very simple, durable, and safe fastening is obtained.

To facilitate the removal of the apparatus from one place to another, any suitable number of hand-rings $t$, Fig. 5, may be provided to engage with a like number of hooks $z$, fixed inside the upper part of the wooden casing $h$.

Having now particularly described and ascertained the nature of my said invention and in what manner the same is to be performed, I declare that what I claim is—

1. The combination with the beverage-container, the gas-holder adjacent thereto, and the lid having the chamber therein and having an orifice from said chamber into said beverage-container, and also an orifice from said chamber into said gas-holder; of a diaphragm closing an orifice in said chamber opening to the atmosphere, a lever passing through said diaphragm into said chamber in lid, a valve in said chamber closing the orifice into said beverage-container, and a diaphragm closing an orifice from the atmosphere into said beverage-container, said last diaphragm and said valve being connected to said lever so that the diaphragm will cause the lever to oscillate on its supporting-diaphragm, in a plane at right angles to said supporting-diaphragm to actuate said valve, substantially as and for the purpose set forth.

2. The combination with the vessel $g$, the gas-holder $r$, and the chambered lid $d$, having an orifice from said chamber into the vessel $g$, and also an orifice from said chamber into the vessel $r$ of the diaphragm $m'$, the lever $i$, passing through said diaphragm $m'$, the valve $o$, on extremity of lever $i$ within said chamber controlling the said orifice leading from the chamber into said vessel $g$, and the diaphragm $m^2$ arranged at right angles to said diaphragm $m'$, and connected to the extremity of lever $i$ outside of said chamber, substantially as and for the purposes set forth.

In testimony that I claim the foregoing as my invention I have signed my name in the presence of two subscribing witnesses.

ERNST MORITZ ECKARDT.

Witnesses:
EMIL REINHELT,
HERNANDO DE SOTO.